United States Patent [19]

Barannik et al.

[11] 4,015,971

[45] Apr. 5, 1977

[54] METHOD OF PRODUCING FERTILIZERS FROM SEA-LIKE WATERS

[76] Inventors: Valery Pavlovich Barannik, ulitsa Gogolya, 24, kv. 24; Arkady Georgievich Kolesnikov, ulitsa Lenina, 33, kv. 51, both of Sevastopol, U.S.S.R.

[22] Filed: Feb. 6, 1975

[21] Appl. No.: 547,875

[52] U.S. Cl. .................................. 71/31; 71/63; 423/140; 210/42 R; 210/50; 210/63 R
[51] Int. Cl.² .................................. C05D 9/02
[58] Field of Search .......... 71/1, 31, 63; 423/140, 423/141, 142; 210/42, 50, 52, 63

[56] References Cited

UNITED STATES PATENTS

| | | | |
|---|---|---|---|
| 2,920,950 | 1/1960 | Heise et al. ...................... | 71/63 X |
| 2,934,419 | 4/1960 | Cook ............................... | 71/1 |
| 3,235,491 | 2/1966 | Rosenberg et al. ............. | 210/54 R X |
| 3,617,560 | 11/1971 | Deul et al. ....................... | 210/50 X |
| 3,816,592 | 6/1974 | Rinaldi et al. .................... | 423/140 |
| 3,849,269 | 11/1974 | Hartwig et al. .................. | 423/139 X |

*Primary Examiner*—Charles N. Hart
*Assistant Examiner*—Ferris H. Lander

[57] ABSTRACT

A method of producing fertilizers from sea-type waters comprising introducing, into said water, bivalent iron ions in an amount ranging from 10 to 100 mg per liter of water at a pH of from 5 to 9. The resulting iron hydroxide sorbs microelements and organic substances present in the water and precipitates therewith. The precipitate is separated and dried. Such precipitate contains mainly iron in an amount of from 23.4 to 31.5%, total carbon 2.3 to 6.0%, total amount of microelements 0.1 to 0.3% and is an efficient fertilizer for agricultural plants. As the source of bivalent iron ions use may be made of spent solutions from etching ferrous metals.

4 Claims, No Drawings

METHOD OF PRODUCING FERTILIZERS FROM SEA-LIKE WATERS

The present invention relates to the production of fertiizers for agriculture and, more specifically to fertilizers produced from sea-like waters. The term "sea-like waters" means any natural water featuring chlorine factors of individual components and elements of the water which are characteristic of ocean water. The chlorine factor is calculated from the formula: $K_{el} = \%\ el \times 100/\%\ Cl$, where % el is the percentage of a component, elements; % Cl is the percentage of chloride ions.

Known in the art are fertilizers produced from sea water. These fertilizers may be exemplified by, for example, potassium salts. Potassium salts are prepared from sea water by addition of phosphate ions to water containing potassium and magnesium, increasing its pH to 7.5–9.5 by means of an ammonium-free base, and separation of a residue the water by filtration, decantation or centrifugation. Potassium salt is separated from the resulting residue of a double slt of potassium-magnesium according to the reaction:

$$MgKPO_4 + NH_4A \rightarrow MgNH_4PO_4 + KA$$

where A is an anion (cf. U.S. Pat. No. 3,195,978).

Another process (U.S. Pat. No. 3,382,038) contemplates recovery of potassium from sea water by the addition of an alkali to increase its pH to 10.5–12 and elevation of the water temperature from 25° to 100° C. Potassium along with other components is precipitated. Finally, potassium may be recovered from sea water by contact with a naturally-occurring zeolite, viz-glauconite, from which it is partially removed by treating with a solution of an ammonium salt the thus-regenerated zeolite or glauconite is again contacted with sea water, followed by treating with a solution of an ammonium salt to produce a potassium salt (U.S. Pat. No. 3,497,314). Potassium salts pertain to the class of microfertilizers and it is necessary to introduce into soil several hundred kilograms of said salts per one hectare. If potassium is recovered from sea water by the above-said processes, losses of such valuable components as ions of ammonium, phosphate-ions, caustic soda are possible as a result of increasing the pH of sea water. Moreover, said salts neither contain microelements and organic substances. Potassium salts recovered from sea water correspond to similar fertilizers, in their efficiency and purpose, produced in various countries from salt deposits on dry land. The only advantage of the above-mentioned fertilizers is that they may be produced by any conuntry with an access to sea water. The main disadvantage of potassium fertilizers produced from sea water resides in a relatively high loss of ammonium and phosphorus ions and a high alkali consumption, whereby production of potassium fertilizers from sea water is limited.

It is an object of the present invention to produce fertilizers from sea water which would contain microelements and active organic substances.

Another object of the present invention is to select such a composition of the fertilizers which would selectively stimulate the growth and evolution of agricultural plants.

Still another object of the present invention is to provide such a composition of the fertilizers which could be used in combination with other type fertilizers.

A further object of the present invention is to provide such a method of producing fertilizers from sea water which would be easily reproduced on a commercial scale on the basis of cheap and readily-available raw materials.

The method of producing fertilizers, according to the present invention comprises introduction, into the sea-like water, of ions of bivalent iron in an amount within the range of from 10 to 100 mg of iron per liter of said water at a pH = 5 to 9; therewith, bivalent iron ions are oxidized and transformed into trivalent iron ions with the formation of iron hydroxide; sorption of microelements and organic substances being present in said water by iron hydroxide at said pH values without sorption of sodium chloride; separation of the resulting precipitate; drying of the separated precipitate to the air-dry state containing predominantly iron in an amount of from 23.4 to 31.5%, total carbon 2.3 to 3.0%, total amount of microelements 0.1 to 0.3%.

As has been mentioned hereinbefore, concentration of hydrogen ions in sea water should be within the pH range of from 5 to 9. If the pH of water is below 5, then the rate of oxidation of $Fe^{2+}$ ions into $Fe^{3+}$ becomes strongly retarded and the fertilizer yield becomes substantially reduced, while at a pH of water above 9 the resulting product becomes diluted with potassium and magnesium hydroxides, wherefore its effectiveness, as a fertilizer, is substantially lowered.

When iron is added to sea water in an amount of less than 10 mg Fe/l, it is necessary to separate too large amounts of water from the precipitate and the fertilizer production cost is substantially increased; if iron is introduced into sea water in an amount of more than 100 mg Fe/l, the resulting product has a small content of organic substances, wherefore its efficiency is reduced.

As a source of bivalent iron ions it is advisable to use ferrous salts both in a solid and liquid state. It is preferred, however, to spent solutions from etching ferrous metals with hydrochloride acid; these solutions are available in considerable amounts from plants of mechanical engineering and ship-building industries. Said solutions are toxic production wastes and great sums of money are allocated to eliminate them, wherefore the use of spent etching solutions for the production of fertilizers is economically efficient and, furthermore, large areas of land and sea are not polluted and, hence, environment pollution is reduced.

Solutions from etching of ferrous metals usually contain 120–160 g of iron per liter of a solution and 30 to 60 g/l of hydrochloric acid; occasionally in such solutions there may be present corrosion inhibitors in an amount of from 0.8 to 1.2% such as a product of copolymerization of urotropin and aniline. Our investigations in vegetation tests under field conditions have shown that corrosion inhibitors being present in the fertilizer do not exert any noticeable effect on the fertilizer efficiency.

In the practice of the present invention, the method according thereto is effected as follows. Sea water is poured into a vessel and ferrous chloride is introduced thereinto in the form of a solid salt, aqueous solution, or spent etching solution at a rate of 10 to 100 mg Fe/l of water. The pH of the water is maintained within the range of from 5 to 9. Ions of bivalent iron introduced into sea water are oxidized according to the following scheme:

$$4Fe^{2+} + O_2 + 2H_2O \rightarrow 4Fe^{3+} + 4OH^-$$

The resulting ions are hydrolyzed:

$$Fe^{3+} + H_2O \rightarrow Fe(OH)^{2+} + H^+$$

with the formation of hydroxide $Fe(OH)^{2+} = H_2O \rightarrow [Fe(OH)_2]^+ + H^+$, containing active positively charged centers capable of recovering, according to the ion-exchange mechanism, valuable metals such as copper, zinc, molybdenum as well as amine complexes and other components from sea water. The resulting precipitates of ferrous hydroxide possess a particular property, i.e. they result in no sorption of sodium ions. This phenomenon is favorable for the fertilizer quality as will be shown hereinbelow. Sorption time is 0.1 to 6.0 hours. Solid particles of iron hydroxide with co-precipitated thereon microelements and organic substances are separated from sea water by decantation with subsequent filtration of the precipitate. The filtered precipitate contains about 70% of water.

This precipitate is dried to the air-dry state, i.e. such a state when the precipitate contains an equilibric amount of humidity under normal conditions. To this end, the precipitate is poured over the ground and dried under environmental conditions or in special drying chambers at a temperature of from 0° to 50° C. When dried at a temperature of above 50° C, the fertilizer may have its activity lost, wherefore the use of such temperatures is not advisable. As a result of these operations, a fertilizer of the above-mentioned composition is obtained.

The present invention has the following advantages: the process of its preparation is rather simple and commercially efficient sources of the starting material, i.e. sea-like waters, are practically unlimited and each country has vast resources of ferrous salts. Taking into account the fact of utilization, with equal success, of waste products containing ferrous salts, economic efficiency is substantially increased. In addition, the method of the present invention contributes to preventing pollution of the environment with poisonous production wastes. The fertilizer according to the present invention has an additional advantage residing in that it steadily increases the yield capacity of numerous agricultural plants by at least 5–10% at an insignificant rate of 0.5 to 3 kg of one hectare. Another feature of the present invention resides in its ability to stimulate the growth of grape vines and increasing the yield capacity of not only pulse plants but other type plants as well.

For a better understanding of the present invention some specific Examples illustrating the method of producing fertilizers as well as the use of the thus-produced fertilizers in with respect to particular agricultural plants.

EXAMPLE 1

Into a pool there was poured Black Sea water with a salinity of 1.83% and composition (percentage of the salt mass): NaCl—77.29; KCl—2.11; MgCl$_2$—8.92; MgSO$_4$—6.33; MgBr$_2$—0.20; CaSO$_4$—3.64; Ca(HCO$_3$)$_2$—1.52.

The water also contained 3.5 mg/l organic substances, $3.10^{-6}$ g Cu/l, $4.10^{-6}$ g Mo/l, $8.10^{-6}$ g Zn/l. It was added with a spent solution from etching of iron containing 120 g/l of Fe, 30 g/l of HCl, and 1% of an inhibitor. Concentration of hydrogen ions in the solution was adjusted to a predetermined value by means of a 36% hydrochloric acid or solid soda; the solution was mixed by means of air bubbling. After settling of the solution for 24 hours, water was decanted. The resulting precipitate was filtered through a dense tissue and dried in the air at a temperature within the range of from 20° to 35° C. Conditions of the process and results obtained are given, for six texts in Table 1 hereinbelow.

Table 1

| Test No. | Volume of water in the pool | Amount of the solution, l. | Iron content, mg/l | Amount of acid and soda HC$_1$, l | Na$_2$CO$_3$ | kg |
|---|---|---|---|---|---|---|
| a | 500 | 44 | 10.5 | — | — | 7.29 |
| b | 340 | 60 | 21.2 | 84 | — | 5.12 |
| c | 225 | 40 | 21.2 | 60 | — | 8.00 |
| d | 500 | 175 | 42 | — | 11 | 6.90 |
| e | 500 | 175 | 42 | — | 18 | 8.00 |
| f | 500 | 420 | 100 | — | 43 | 8.00 |

Chemical characteristics of the products obtained in tests a, b, c, d, e are given in Table 2.

Table 2

| Elements | Content of elements in precipitates | | | |
|---|---|---|---|---|
| | a | b | d | e |
| Fe$^{3+}$ | 27.4 | 18.3 | — | 29.3 |
| Fe$^{2+}$ | 2.52 | 5.15 | — | 2.2 |
| Ca | 0.70 | 0.9 | 0.75 | 0.68 |
| Mg | 0.68 | 0.9 | 0.42 | 0.65 |
| Cu | 0.009 | 0.007 | 0.009 | 0.01 |
| Ni | 0.01 | 0.005 | 0.008 | 0.007 |
| Zn | 0.20 | 0.01 | 0.20 | 0.25 |
| C total | 2.30 | 6.00 | 2.50 | 2.30 |
| N (amine) | 0.19 | 0.48 | 0.28 | 0.12 |
| S total | 0.05 | 0.055 | 0.05 | 0.05 |
| Cl total | 7.00 | 7.10 | 7.00 | 5.95 |
| Losses at calcination, 800° C | 34.90 | — | 25.00 | 34.90 |

It may be seen from Table 2 that the fertilizers produced at a higher concentration of hydrogen ions in the solution contain greater amounts of organic substances, while at a lower concentration of hydrogen ions in the solution fertilizers with a greater content of microelements are produced.

It has been found that a pH within the range of from 6.9 to 7.2 was the most advantageous for the process. This pH range was selected due to the fact that practically no hydrochloric acid or sodium carbonate need to be added to the sea water, whereby fertilizers with a minimal production cost could be obtained.

Vegetation tests of the fertilizers for growth and development of various agricultural plants have shown a high efficiency thereof.

EXAMPLE 2

Effect of the fertilizers produced from sea water in tests a and d was determined in vegetation field experiments according to the following scheme:
1. Control - seeds not treated with the fertilizers
2. Seeds treated with the fertilizes
3. Fertilizers were introduced into soil.

The tests were performed on soils of Ucraine and Moldavia. In vegetation experiments the effect of a pre-seeding treatment of seeds as well as the soil dressing effect on the productivity of sugar beet and corn were studied. Seeds of sugar beet and corn were treated at the rate of 0.125 kg of the fertilizer per 100 kg of seeds of corn and 1.0 kg. of the fertilizer per 100 kg. of seeds of sugar beet. The solid was dressed, for sugar beet, at the rate of 1.5 kg of the fertilizers, and for corn at the rate of 0.5 kg of the fertilizers per 10 kg of commercial fertilizer mixture based on nitrogen, phosphorus and potassium (referred to hereinafter as NPK for the sake of brevity). Each experiment was repeated 5 times. Soil humidity in the experiments was 70% of the total moisture-absorbing capacity of the soil. The results of the vegetation tests of sugar beet and corn are given in Table 3 hereinbelow.

Table 3

| Treatment conditions | % of the control total mass | % of the control grain | Sugar content, % | Harmful nitrogen, % |
|---|---|---|---|---|
| | Sugar beet | | | |
| Control | 100.0 | — | 12.0 | 4.38 |
| Seeds with fertilizer | 115.8 | — | 13.6 | 3.24 |
| Seeds treated with boric acid [2] | 97.5 | — | 11.6 | 3.70 |
| Fertilizers introduced into soil | 127.1 | — | 13.8 | 3.49 |
| Boron introduced into soil | 153.8 | — | 14.0 | 3.28 |
| | Corn[1] | | | |
| Control | 100.0 | 100.0 | — | — |
| Seeds with fertilizers | 110.8 | 112.4 | — | — |

[1] Soil was dressed with NPK fertilizers.
[2] Boric acid is a classic fertilizer for sugar beet.

It follows from Table 3 that the use of the fertilizer according to the present invention increases the total mass of beet, its sugar content, reduces the content of harmful nitrogen. For corn there is an increase in total mass and grain. According to the visual observations, beets to which the fertilizers of the present invention were used in combination with pre-seeding enrichment of seeds and with its introducing into soil, showed a more developed leaf surface.

EXAMPLE 3

In 1972 under field conditions the influence of pre-seeding enrichment of seeds with the fertilizer of the present invention on yield and sugar content on podzolic soils was studied. Meteorological conditions of that year were unfavorable for sugar beet. In the beginning of the vegetation period there was an insufficient amount of humidity in the soil, poor precipitation, while at the end of the period there was an abundant precipitation which made the soil more dense thus imparing its aeration.

According to the data provided by the meteorological station of the region where the experiments were performed, stock of humidity in a one-meter soil layer was 22 mm during the test period at the relative humidity of air of 62%. Only in July and August in a meter soil layer the stock of humidity increased to 104–176 mm at a relative humidity of air 70–75% while in September there was a drought again.

Efficiency of the fertilizers under these conditions is shown in Table 4.

Table 4 illustrates unquestionable improvement of said characteristics by using the fertilizer according to the present invention.

Table 4

| Test | Area, ha | Yield, c/ha | Sugar content, c/ha | Sugar output, c/ha |
|---|---|---|---|---|
| 1972 | | | | |
| Control | 5 | 297 | — | — |
| Seeds treated with the fertilizer | 5 | 361 | — | — |
| Control | 2 | 233 | 17.4 | 40.54 |
| Seeds treated with the fertilizer | 2 | 254 | 17.8 | 45.21 |
| 1973 | | | | |
| Control | 10 | 420 | 19.0 | 79.80 |
| Use of fertilizers for seeds | 10 | 423 | 19.8 | 85.75 |
| Fertilizers introduced into soil | 10 | 471 | 20.1 | 94.67 |

It should be noted that the fertilizer introduced into soil is located in places of root spreading. This phenomenon was noticed both in laboratory and nature; it probably exerts a favorable action on the plant growth.

EXAMPLE 4

The fertilizer of the present invention produced in test d was tested during a two years' period for soil dressing of two strains of grapes "Risling" "Rkatsiteli" and cabbage "Mozharskaja". Dressing was effected by means of a 1% aqueous solution of the fertilizer suspension simultaneously with nitrous fertilizers in the amount of 400 l of the suspension per one hectare. The soil for cabbage was dressed with a 0.5% aqueous solution of the fertilizer suspension in the amount of 400 l per one hectare. The test results are given in Table 5.

Table 5

| Test | Area, ha | 1972 Yield c/ha | 1972 % of the control | Sugar, % | acidity, g/l | 1973 Yield c/ha | 1973 % of the control |
|---|---|---|---|---|---|---|---|
| | | grapes "Risling" | | | | | |
| Control | 2 | 72.0 | 100 | 18.8 | 8.9 | 93.0 | 100 |
| Dressing | 2 | 84.6 | 117.5 | 19.6 | 8.9 | 112.0 | 120.4 |
| | | grapes "Rkatsiteli" | | | | | |
| Control | 0.5 | 71.4 | 100.0 | 18.6 | 10.8 | 93.0 | 100.0 |
| Dressing with the fertilizer of the invention | 0.5 | 87.0 | 121.8 | 19.1 | 10.8 | 112.1 | 120.4 |
| | | Cabbage | | | | | |

Table 5-continued

| Test | Area, ha | 1972 Yield c/ha | 1972 % of the control | Sugar, % | acidity, g/l | 1973 Yield c/ha | 1973 % of the control |
|---|---|---|---|---|---|---|---|
| Control | 0.5 | 210 | 100.0 | — | — | — | — |
| Spraying with the suspension of sea water preparation | 0.5 | 250 | 119.0 | — | — | — | — |

As seen from the data of this Table, the use of the fertilizer of the present invention increases the yield of grapes and, to some extent, its sugar content; yield of cabbage is substantially increased.

In addition to said plants, we have performed vegetation and field tests of the fertilizer of the present invention on such plants as pea and millet. These test also provide the efficiency of the fertilizers according to the present invention, since the results of four field tests on gray podzol soils and grassland chernozems showed an increased, by 21–62 c/ha, yield of sugar beet, improved sugar content by 0.4–0.8%; sugar output was increased by 4.7–5.0 c/ha.

Soil dressing with the fertilizer of the present invention along with NPK, as determined by the results of one experiment on gray polzol soils, increased the yield of sugar beet roots by 51 c/ha with simultaneous increase in the root sugar content by 1.1%.

The yield of corn silage mass in one experiment on solonetz-chestnut soils was increased, as compared to the control value, by 40 c/ha and yield of corn grain - by 4.4 c/ha.

The yield of corn silage mass in three experiments on calcareous-chestnut, solonetz-chestnut and grassland-chernozemic soils was increased by 20 to 40 c/ha.

The yield of winter wheat in two experiments on gray podzol and calcareous-chestnut soils was increased by 3.0–3.6 c/ha; yield of corn grain under the same conditions as for wheat was increased by 3.7 c/ha.

The yield of millet, according to the data of a two-years' test period, on grassland-chernozems was increased by 6.8–8.8 c/ha.

What is claimed is:

1. A method of producing fertilizers from sea-like waters comprising introducing, into said water, bivalent iron ions in an amount within the range of from 10 to 100 mg per liter of water at a pH of from 5 to 9, said bivalent iron ions being oxidized and transformed into trivalent iron ions with the formation of iron hydroxide; allowing the iron hydroxide-containing water to stand to permit sorption of microelements and organic substances present in said water by said iron hydroxide at a sorption time of at least 0.1 hour within said pH range without sorption of sodium chloride under said conditions; separating the resulting precipitate; drying the separated precipitate to the air-dry state to produce a fertilizer containing mainly iron in an amount of from 23.4 to 31.5%, total carbon 2.3 to 6.0% and total amount of microelements of 0.1 to 0.3%.

2. The method of claim 1, wherein the source of bivalent iron ions is a spent soluton from etching ferrous metals.

3. The method of claim 1, wherein the separated precipitate is dried at a temperature within the range of from 0° to 50° C.

4. The fertilizer produced by the method of claim 3.

* * * * *